United States Patent [19]

Aoki et al.

[11] Patent Number: 5,431,208

[45] Date of Patent: Jul. 11, 1995

[54] RADIAL TIRE

[75] Inventors: Chieko Aoki; Kazuo Asano, both of Kobe, Japan

[73] Assignee: Sumitomo Rubber Industries, Ltd., Kobe, Japan

[21] Appl. No.: 118,661

[22] Filed: Sep. 10, 1993

[30] Foreign Application Priority Data

Sep. 16, 1992 [JP] Japan .................................. 4-273773
Jul. 2, 1993 [JP] Japan .................................. 5-190791

[51] Int. Cl.⁶ ........................................................ B60C 107/00
[52] U.S. Cl. .................................................... 152/209 R
[58] Field of Search ................ 152/209 R, 209 D, 454

[56] References Cited

U.S. PATENT DOCUMENTS

| | | | |
|---|---|---|---|
| 4,811,771 | 3/1989 | Shoemaker et al. ................. | 152/454 |
| 4,815,512 | 3/1989 | Gerresheim et al. ............ | 152/209 R |
| 5,178,699 | 1/1993 | Kakumu et al. ................. | 152/209 R |
| 5,222,537 | 6/1993 | Saito et al. .......................... | 152/454 |

FOREIGN PATENT DOCUMENTS

| | | | |
|---|---|---|---|
| 197735 | 10/1986 | European Pat. Off. . | |
| 321384 | 6/1989 | European Pat. Off. . | |
| 0454657 | 10/1991 | European Pat. Off. ........ | 152/209 R |
| 2235811 | 1/1975 | France . | |
| 62-122810 | 1/1987 | Japan . | |
| 62-122804 | 6/1987 | Japan . | |
| 157810 | 7/1987 | Japan . | |
| 0061607 | 3/1988 | Japan ............................. | 152/209 A |
| 1204807 | 8/1989 | Japan . | |
| 3128704 | 5/1991 | Japan ............................. | 152/209 R |
| 3253409 | 11/1991 | Japan ............................. | 152/209 R |
| 2210002 | 6/1989 | United Kingdom ............ | 152/209 R |

*Primary Examiner*—Michael W. Ball
*Assistant Examiner*—Steven D. Maki

[57] ABSTRACT

A radial tire improved in total performance which comprises a tread portion; the tread portion provided with a block pattern consisting of blocks defined by at least one circumferential groove and a plurality of axial grooves: the block pattern having a land ratio of not less than 0.67; with respect to blocks BT which exist wholly or partially in the ground contacting part of the tread, the total $\Sigma I_x$ of the second moment of areas $I_x$ of all said blocks BT being larger than the total $\Sigma I_y$ of the second moment of areas $I_y$ of all said blocks BT, wherein each said second moment of area $I_x$ is of the shape of the top surface of each block BT about a circumferential line (X) passing a center point (O) on the top surface, and the second moment of area $I_y$ is of the shape of the top surface about an axial line (Y) passing the center point (O).

4 Claims, 9 Drawing Sheets

FIG. 11(a)
Ref.1

FIG. 11(b)
Ref.2

FIG. 11(c)
Ref.3

—— With Bead Filler
--- Without Bead Filler

RADIAL TIRE

BACKGROUND OF THE INVENTION

The present invention relates to a radial tire improved in total performance by improving the tread pattern.

Recent high performance cars, in particular sport type cars, require a tire improved in total performance for safety running.

In general, the total performance of a tire can be improved by increasing the side force of the tire during running. In order to increase such a side Force, it has been employed, For example, to decrease the tread rubber thickness, to increase the tread rubber hardness, to reinforce the tire tread portion by disposing a breaker belt, to increase the tire lateral stiffness by disposing a reinforcing cord layer, and to decrease the tire aspect ratio.

However, it was found that the recent severe requirements can not be satisfied only by the above-mentioned countermeasures. Further, it was found that when the tire lateral stiffness is increased, linearity of the side force is liable to be disturbed, and the straight running performance is deteriorated.

SUMMARY OF THE INVENTION

It is therefore, an object of the present invention to provide a radial tire, in which by improving the tread pattern with respect to the rigidity balance between the tire circumferential direction and axial direction, the total performance is improved to satisfy the severe requirements.

According to one aspect of the present invention, a radial tire comprises
a tread portion,
a pair of bead portions with a bead core therein,
a pair of sidewall portions extending therebetween,
a radial carcass extended between the bead portions and turned up around the bead cores, and
a belt disposed radially outside the carcass,
the tread portion provided with a block pattern consisting of blocks defined by at least one circumferential groove and a plurality of axial grooves,
the block pattern having a land ratio of not less than 0.67,
with respect to blocks which exist wholly or partially in the ground contacting part of the tread, the total $\Sigma I_x$ of the second moment of areas $I_x$ of all the blocks BT being larger than the total $\Sigma I_y$ of the second moment of areas $I_y$ of all the blocks BT, wherein each second moment of area $I_x$ is of the shape of the top surface of each block BT about a circumferential line (X) passing a center point (O) on the top surface, and the second moment of area $I_y$ is of the shape of the top surface about an axial line (Y) passing the center point (O). Accordingly, the pattern stiffness of the block pattern in the tire axial direction becomes larger than the pattern stiffness in the tire circumferential direction. As a result, it becomes possible to increase the side force to improve the total tire performance.

BRIEF DESCRIPTION OF THE DRAWINGS

Embodiments of the present invention will now be described in detail in conjunction with the accompanying drawings, in which:

FIG. 8 is a diagram explaining the lengths of axial and circumferential components of a sipe.

DETAILED DESCRIPTION OF THE INVENTION

Figure 1:
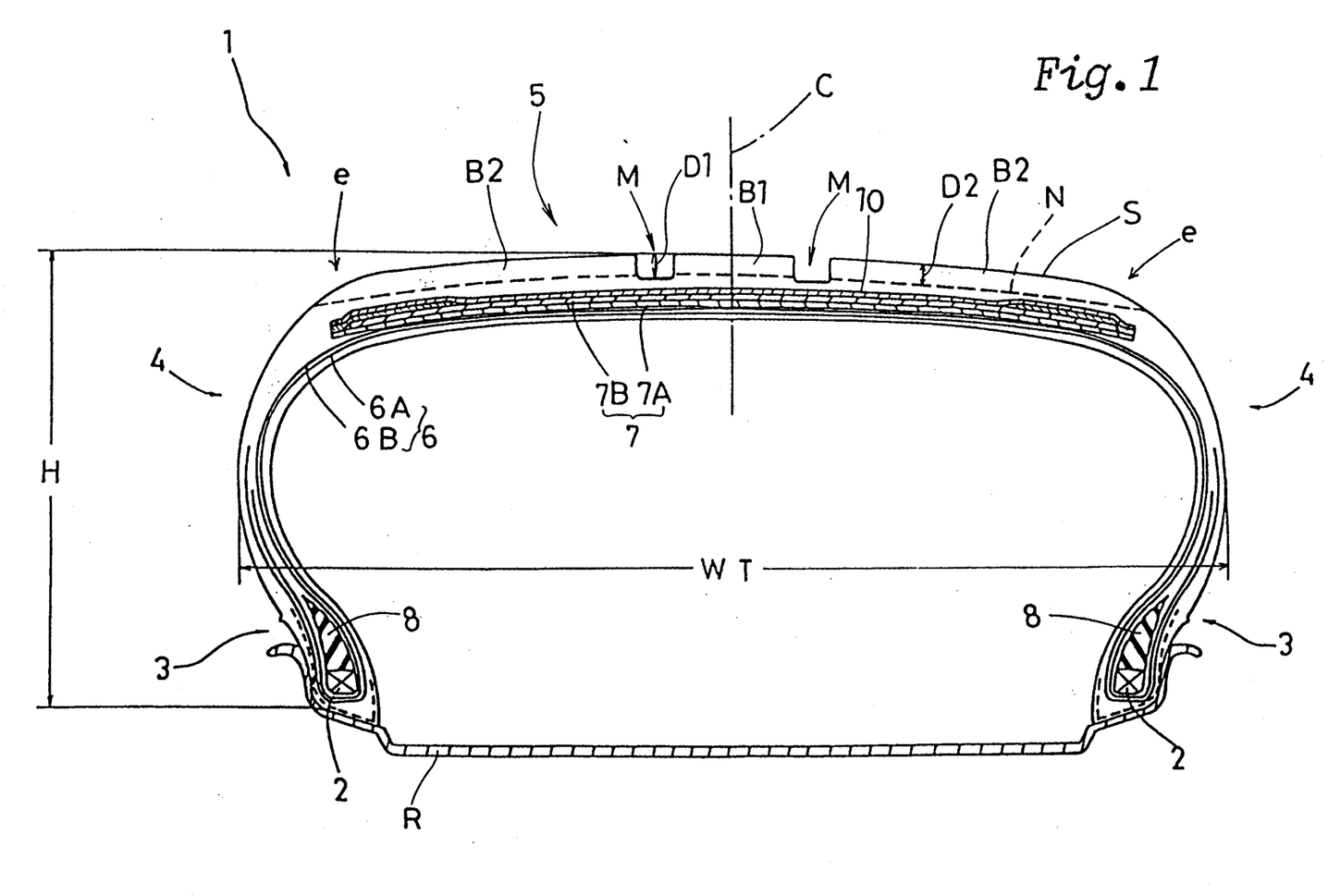
FIG. 1 is a cross sectional view of an embodiment of the present invention.

In the figures, a radial tire 1 is a low aspect belted radial tire for a passenger car. The tire 1 has a tread portion 5, a pair of bead portions 3 with a bead core 2 therein, and a pair of sidewall portions 4 extending therebetween.

The tire 1 comprises a carcass 6 extended between the bead portions and turned up around the bead cores 2, a breaker belt 7 disposed radially outside the carcass 6 and inside the tread portion 5, and a band belt 10 disposed on the radially outside of the breaker belt 7 to cover at least axial edge portions of the breaker belt 7.

The carcass 6 in this embodiment is composed of two plies 6A and 6B of polyester cords arranged radially at an angle of 75 to 90 degrees with respect to the tire equator C. Both the plies are turned up around the bead cores 2 from the axially inside to the outside of the tire. The turned up portions of the radially inner carcass ply 6A are extended radially outwardly over the turned up portions of the radially outer carcass ply 6B to cover the radially outer edges thereof, and terminated near the maximum tire section width point. Therefore, due to such high carcass turnup structure, the rigidity of the bead portion 3 and sidewall lower portion is increased.

The breaker belt 7 is composed of at least two cross plies 7A and 7B of high modulus cords, in this embodiment steel cords, laid at an angle of from 10 to 30 degrees with respect to the tire equator C. The breaker belt 7 is disposed over the entire width of the tread portion 5, and the edges thereof are extended to beneath the tread edges (e) in order to improve the tread rigidity.

The band belt 10 is for preventing the tread portion 5 from being lifted by the centrifugal force during high speed running, and is made of organic fiber cords such as nylon cord and the like.

Figure 2:
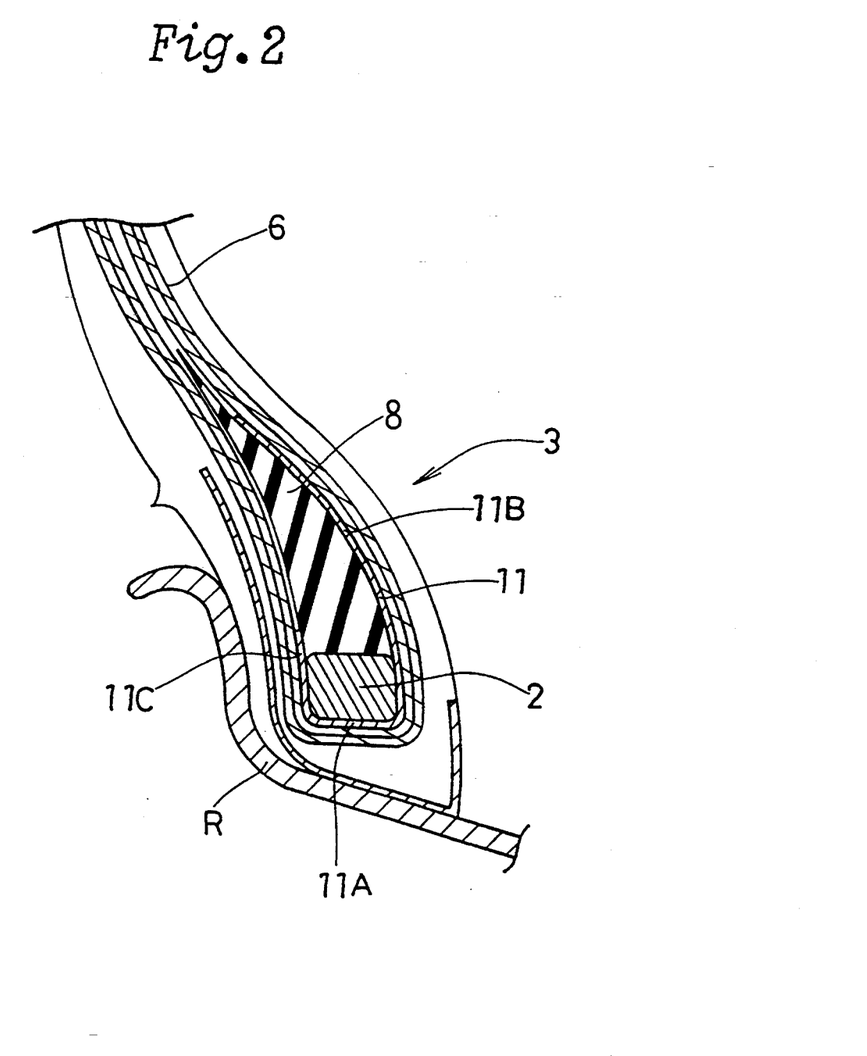
FIG. 2 is a cross sectional view of the bead portion.

Each bead portion 3 is, as shown in FIG. 2, provided with a bead apex 8 extending radially outwardly from the bead core 2, and a bead filler 11 covering the bead core 2 to reinforce the bead portion 3.

The bead apex 8 is made of hard rubber having a JIS A hardness of from 90 to 120 degrees extending taperingly radially outwardly from the bead core. The radially outer edge thereof is terminated at a radial position between the maximum tire width position and the radially outer end of a flange of a regular rim.

The bead filler 11 is composed of at least one ply of steel cords laid at an angle of from 20 to 60 degrees with respect to the circumferential direction of the tire. In this embodiment, the bead filler 11 has a main portion 11A along the bottom face of the bead core 2 and axially inner and outer turned up portions 11B and 11C extending from the axially inner and outer edges of the main portion in contact with side faces of the bead apex 8. The radially outer edge of the axially outer turned up portion 11C is terminated radially inward of the radially outer end of the rim flange to avoid concentration of bending stress. On the other hand, the radially outer edge of the inner turned up portion 11B is extended over the radially outer end of the rim flange, in this embodiment to the substantially same height as the bead apex 8. Therefore, the rigidity of the bead portion is greatly increased in cooperation with the hard rubber bead apex having a hardness of not less than 90 degrees. If the JIS A hardness of the bead apex 8 is more than 120 degrees, the bead rigidity excessively increased to deteriorate ride comfort. If the cord angle of the bead filler 11 is less than 20 degrees, the shaping of the bead filler is difficult. If the cord angle is more than 60 degrees, the rigidity increasing effect is insufficient.

In this embodiment, the aspect ratio H/WT of the tire is not more than 0.60, in this example 0.5. Incidentally, the aspect ratio is defined as the tire section height H divided by the tire width WT.

In such a low aspect tire, by increasing the bead rigidity, the effect of an improvement in the pattern stiffness (described later) upon total tire performance can be effectively increased. Thus, the effect of the present invention is further enhanced.

Figure 3:
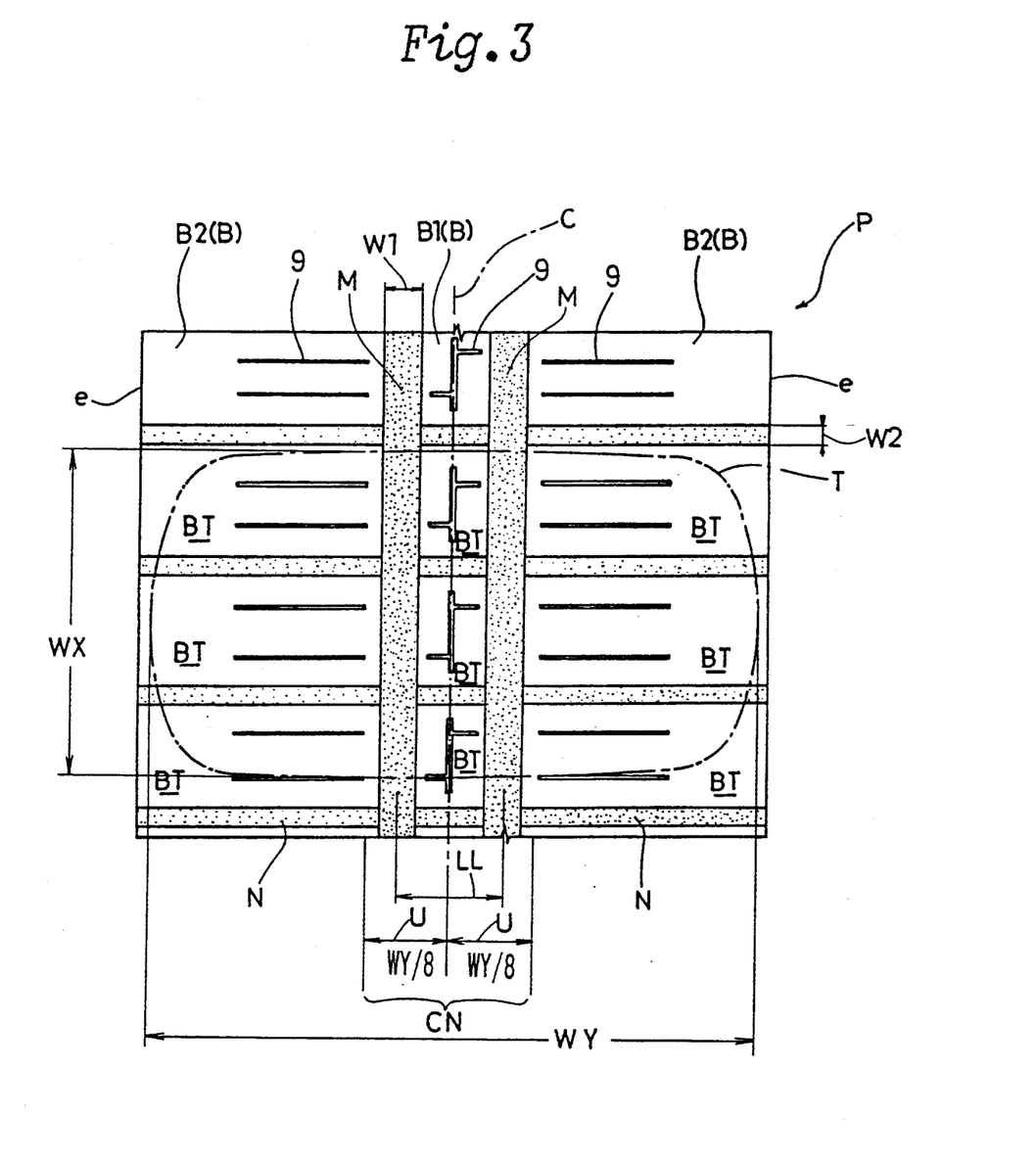
FIG. 3 is a partial plan view of the tire showing a block pattern.

According to the present invention, the tread portion 5 is provided with a block type pattern P. In this embodiment, as shown in FIG. 3, the tread portion 5 is provided with a pair of circumferential grooves M extending continuously circumferentially of the tire, each disposed on each side of the tire equator C, and axial grooves N extending continuously from one tread edge (e) to the other tread edge (e), crossing the circumferential grooves M. Accordingly, the block pattern P in this embodiment consists of a plurality of central blocks B1 between the circumferential grooves M, and a plurality of lateral blocks B2 between each of the circumferential grooves M and each tread edge (e). (Hereinafter, the central and lateral blocks B1 and B2 are generically called "block B".)

The depth D1 of the circumferential grooves M is not less than 8 mm and the groove width W1 is not less than 10 mm. Preferably, the groove depth D1 is not more than 15 mm. If the depth is more than 15 mm, the pattern rigidity is excessively decreased, and as a result, a required cornering power can not be obtained. Preferably, the groove width W1 is not more than 45 mm. If the width is more than 45 mm, the sea/land ratio of the tread pattern is excessively increased, and the grip performance is deteriorated.

The circumferential groove M in this example are a straight groove having a constant width and a constant depth in the longitudinal direction.

The two circumferential grooves M are disposed within a tread central region CN defined as such a region being centered on the tire equator C and having an axial width of $\frac{1}{2}$ times the ground contacting width WY. Further, the axial distance of the axially outer edge of each circumferential groove M from the tire equator C is smaller than $\frac{1}{8}$ times the ground contacting width WY. Furthermore, the axial distance LL between the circumferential grooves M measured between the groove centers is in the range of from 0.1 to 0.20 times the ground contacting width WY. If the circumferential grooves M are formed outside of the central region CN, the side force is decreased at the time of cornering, and the cornering performance is decreased.

Here, the ground contacting width WY is the maximum axial width of the ground contacting part T when the tire is mounted on its regular rim R and inflated to its regular inner pressure and loaded by its regular load. The regular rim is a rim officially recommended for the tire by TRA (USA), ETRTO (Europe), JATMA (Japan) and the like, and the regular inner pressure and the regular load are the maximum air pressure and the maximum tire load for the tire officially specified in Airpressure/Max.-loads Table by the same association or organization.

Each of the axial grooves N in this embodiment is a straight groove laid in parallel to the tire axial direction, that is, at an angle of 0 degree to the axial direction. Accordingly, the block B has a rectangular shape as shown in FIG. 3. However, the axial grooves N can be inclined at a small angle $\alpha$ of not more than 20 degrees but more than 0 degree to the axial direction. Further, the axial grooves can be formed in a curved configuration in which the tangential angle $\alpha$ is not more than 20 degrees to the axial direction at any position.

The depth D2 of the axial grooves N is less than the above-mentioned groove depth D1, in this example about 6 mm. The groove width W2 of the axial grooves N is less than the above-mentioned groove width W1, preferably 0.4 to 0.6 times the groove width W1. If the groove depth D1 is less than 8 mm, or the groove width W1 is less than 10 mm, or the groove depth D1 is less than the groove depth D2, drainage becomes insufficient, and aquaplane resistance is greatly decreased.

By adjusting the groove widths W1 and W2, the land ratio of the block pattern P is set to be not less than 0.67. Here, the land ratio is the ratio Sb/St of the total area Sb of the top surfaces of all the blocks B1 and B2 to the total area St of the tread face S. More preferably, the land ratio Sb/St is not more than 0.80 in order to maintain a required wet grip performance. Thereby, the actual ground contacting area is increased to decrease the ground pressure, that is, to increase the coefficient of friction to the road surface. As a result, side force, traction and braking force are increased.

To increase the lateral stiffness of the tire, the above-mentioned ground contacting width WY of the ground contacting part T is preferably not less than 1.4 times the ground contacting length WX which is the maximum circumferential length of the ground contacting part T. However, to maintain the required traction performance, it is preferable to limit the ground contacting width WY to not more than about 2.0 times the ground contacting length WX.

According to the present invention, the pattern stiffness of the block pattern (P) in the tire axial direction (hereinafter axial pattern stiffness) is greatly increased in comparison with the pattern stiffness of the block pattern (P) in the tire circumferential direction (hereinafter circumferential pattern stiffness). Here, the pattern stiffness in a given direction is defined as the total rigidity in the given direction of all the blocks BT which exist wholly or partially in the ground contacting part T.

Figure 4:
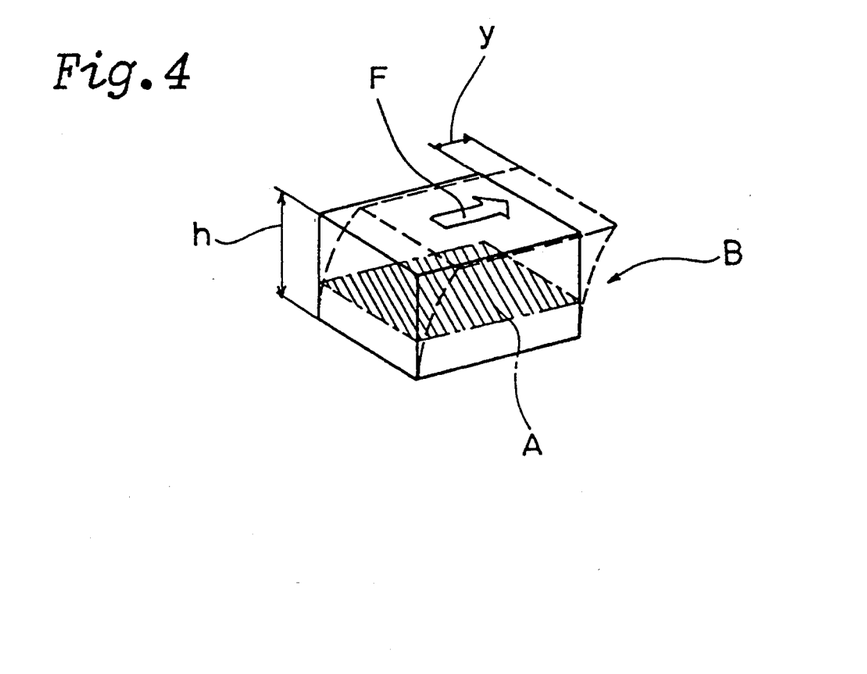
FIGS. 4 and 5 are diagrams explaining a rigidity of a block.

As shown in FIG. 4, when an external force (F) from the road surface is applied to the top surface of a block (B) and the block (B) exhibits a displacement (y), the rigidity (K) of the block in the direction of the applied force (F) is given by F/y, that is, $$K = F/y.$$

Figure 5:
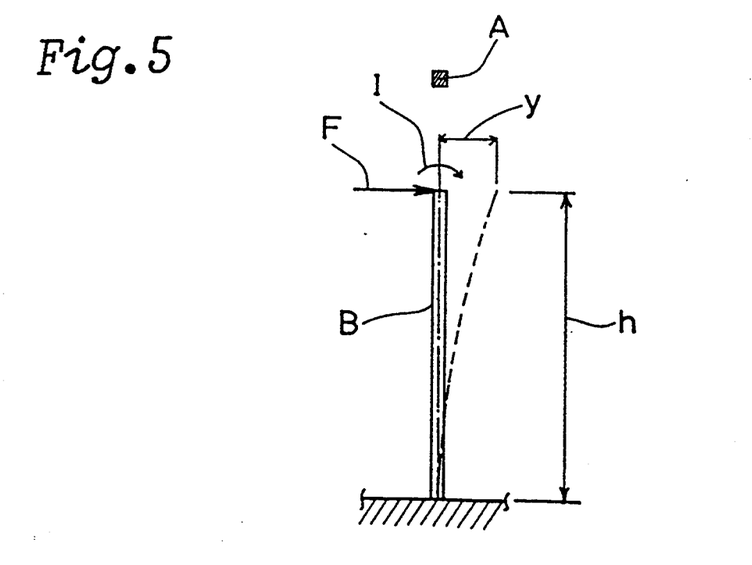

Since the block (B) is Fixed only at its base, if it is assumed as a cantilever as shown in FIG. 5, we find that the displacement (y) equals to the summation of a bending displacement (y1) and a shearing displacement (y2) caused by the external Force (F), that is, $$y = y1 + y2.$$

Here, the displacement (y1) and (y2) are given by the following equations (1) and (2):

$$Y1 = F h^3/3E I \quad (1)$$

$$Y2 = F h/G A \quad (2)$$

where

F = External force
h = Block height
E = Elastic modulus of block rubber
G = Shear modulus of block rubber
I = Second moment of area of block surface
A = Block section area.

Accordingly, the block rigidity (K) in the direction of the force (F) can be written as $$\begin{aligned} K &= F/y \\ &= F/(y1 + y2) \\ &= 1/((h^3/3EI) + (h/AG)). \end{aligned} \quad (3)$$

One finds from equation (3) that the block rigidity (K) can be increased by increasing the second moment of area (I).

Figure 6:
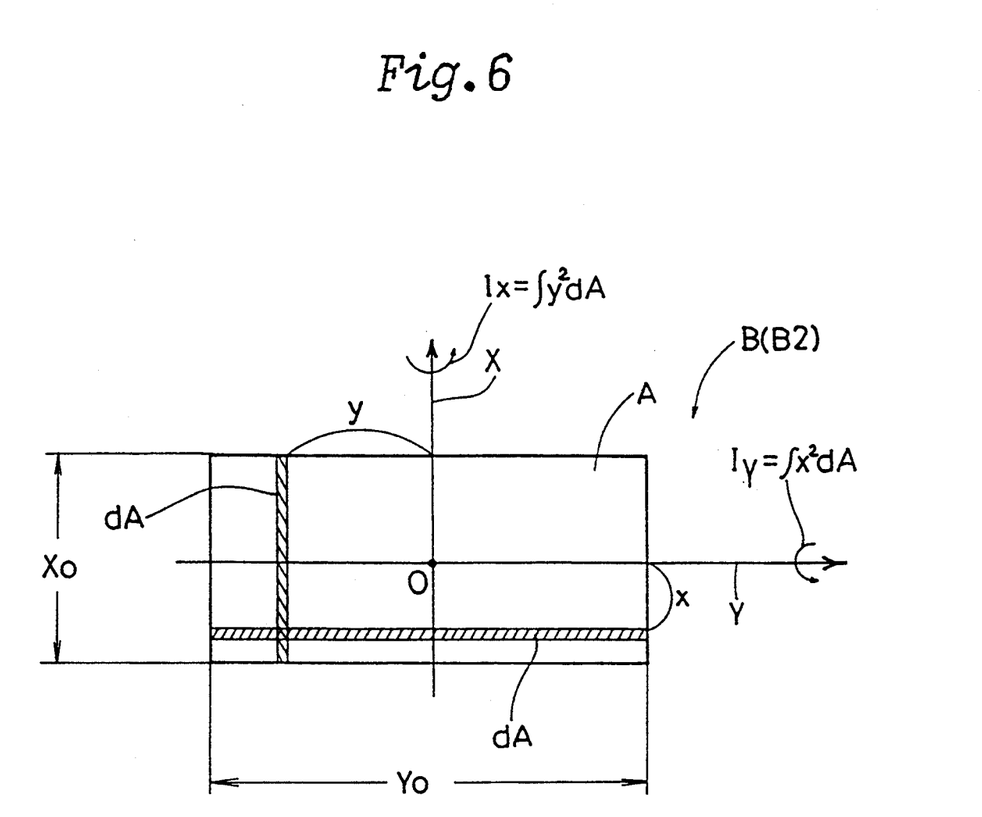

On the other hand, as shown in FIG. 6, the second moment of area $I_x$ about a circumferential line (X) passing a center (O) of the block at the top surface and the second moment of area Iy about an axial line (Y) passing the center (O) are given by the following equations (4) and (5):

$$I_x = \int y^2 \, dA \quad (4)$$

$$I_y = \int x^2 \, dA. \quad (5)$$

The second moment of area $I_y$ is concerned with the bending rigidity of a block against a circumferential external force. On the other hand, the second moment of area $I_x$ is concerned with the bending rigidity against an axial external Force.

According to the present invention, therefore, with respect to the blocks BT which exist wholly or partially in the ground contacting part T, the total $\Sigma I_x$ of the second moment of areas $I_x$ of all the blocks BT is set to be larger than the total $\Sigma I_y$ of the second moment of areas $I_x$ thereof, whereby, the pattern stiffness of the block pattern P is improved with respect to the balance between the axial direction and circumferential direction, and the total tire performance can be improved.

On the other hand, in a rectangular block such as the block B of FIG. 6, if the axial width is a constant value of YO and the circumferential length is a constant value of XO, then $$I_x = XO \; YO^3/12, \text{ and}$$

$$I_y = YO \; XO^3/12.$$

By those equations, $$I_x/I_y = YO^2/XO^2.$$

Figure 7:
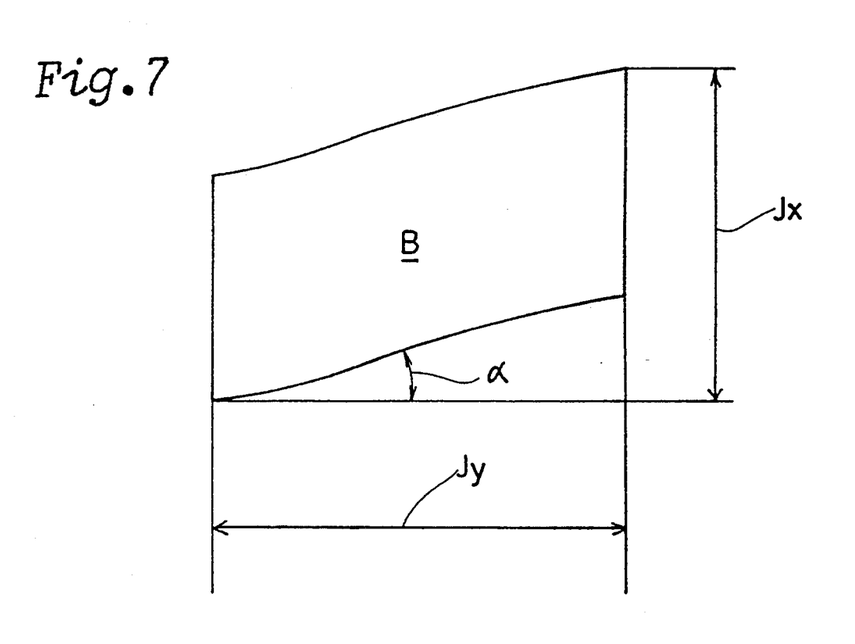
FIG. 7 is a diagram explaining a $\Sigma J y^2 / \Sigma J x^2$ ratio of a block.

Therefore, we find that the ratio of the axial bending rigidity to the circumferential bending rigidity is concerned with the "$YO^2/XO^2$". This was confirmed as true with respect to various block shapes similar to a rectangular shape, for example as shown in FIG. ? .

In this embodiment, therefore, with respect to the blocks BT which exist wholly or partially in the ground contacting part T, the total square width $\Sigma Jy^2$ is in the range of from 2.5 to 50 times the total square length $\Sigma Jx^2$, wherein the total square width $\Sigma Jy^2$ is the total of the squares $Jy^2$ of all the blocks BT, Jy being the maximum axial width of each block at the top surface, and the total square length $\Sigma Jx^2$ is the total of the square $Jx^2$ of all the blocks BT, Jx being the maximum circumferential length Jx of each block at the top surface.

When $\Sigma Jy^2$ is 2.5 to 50 times $\Sigma Jx^2$, the block pattern P is improved in the pattern stiffness with respect to the balance between the axial direction and circumferential direction, and the steering stability can be improved. When less than 2.5 times, the side force becomes small to generate less cornering power during cornering, and cornering becomes difficult. On the contrary, when more than 50 times, it becomes liable to be oversteer during cornering, and the controllability is deteriorated.

Further, in this embodiment, the block BT is provided with a sipe 9 to improve the wet antiskid performance. The sipe 9 is a cut or slot having no width or a very narrow width in comparison with the grooves M and N. The depth of the sipe 9 is preferably in the range of from 0.5 to 0.7 times the depth D1 of the circumferential groove M, and less than the depth D2 of the axial grooves N. The sipe in this embodiment is formed within the block, that is, all the ends are terminated within the block.

Figure 8:
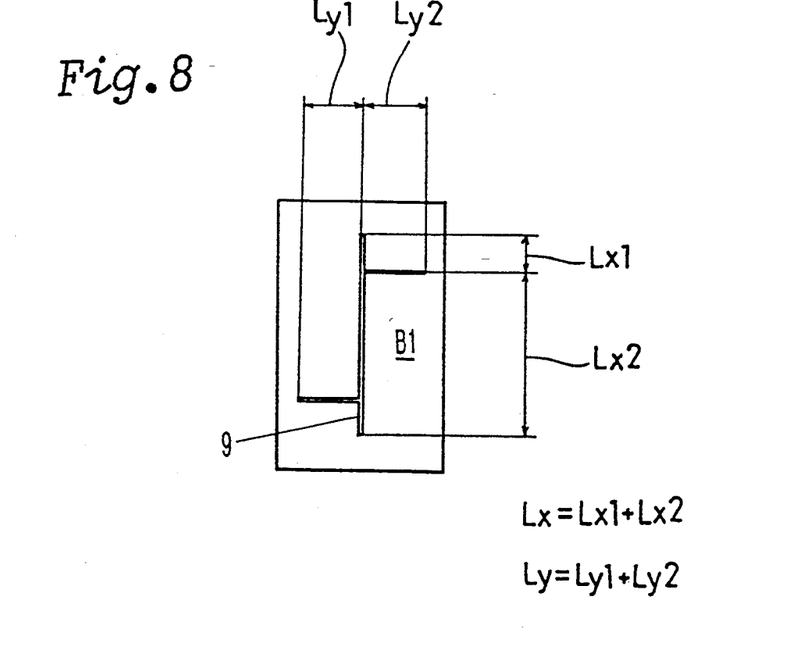
FIG. 8 is a diagram explaining a second moment of area of a block.

With respect to the sipes 9 provided on the blocks BT in the ground contacting part T, the total $\Sigma Lx$ of the lengths Lx of the circumferential components of all the sipes is set to be smaller than the total $\Sigma Ly$ of the lengths Ly of the axially components of all the sipes. FIG. 8 shows the sipe 9 formed on the block B1, wherein the circumferential component length $Lx = Lx1 + Lx2$, and the axial component length $Ly = Ly1 + Ly2$. In the block B1, Lx > Ly, but in the block B2, Lx < Ly, and as a whole $\Sigma Lx < \Sigma Ly$. Thereby, the axial stiffness is increased in comparison with the circumferential stiffness.

Test tires of size 225/50ZR16 having the structure shown in FIG. 1 were made, and were tested for the response gain, linearity, rear grip, high speed stability and maneuverability, using a rear wheel drive sport car. The test results and the specifications of the test tires are shown in Table 1.

Figure 10:
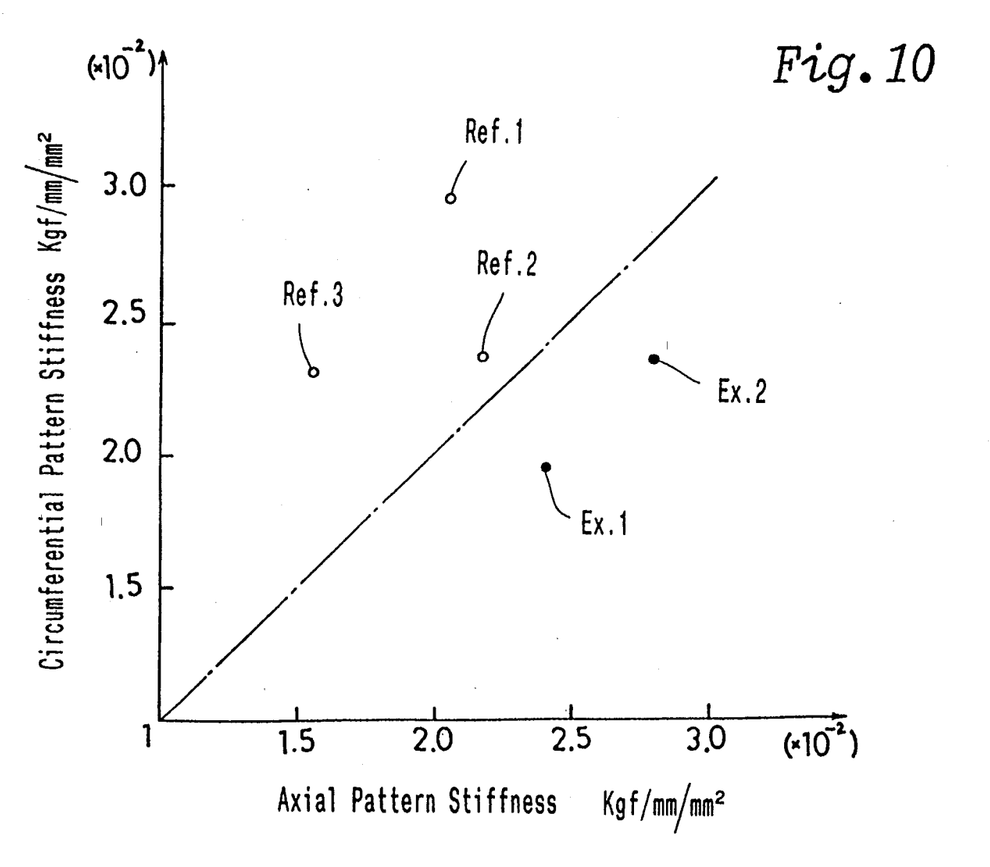
FIG. 10 is a graph indicating the axial pattern stiffness and circumferential pattern stiffness of the test tire.
Figures 11A, 11B, 11C, 11D, 11E:
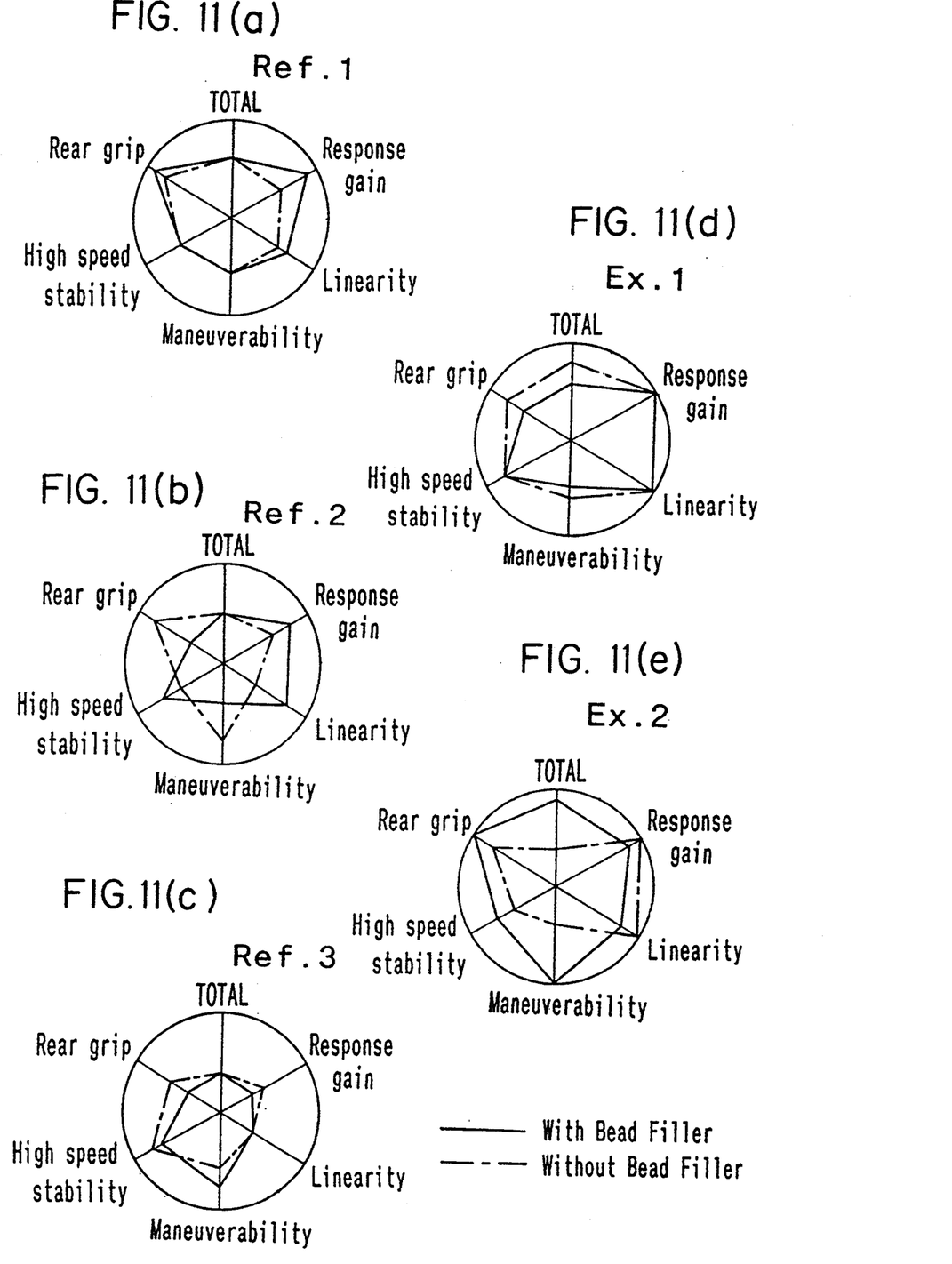
FIGS. 11(a)–(e) are charts showing test results.

In the Example tires 1 and 2 of the present invention, in which the $\Sigma I_x/\Sigma I_y$ ratio was more than 1 and the $\Sigma Jy^2/\Sigma Jx^2$ ratio was in the range of 2.5 to 50, the axial pattern stiffness was greatly increased in comparison with the circumferential pattern stiffness as shown in FIG. 10. Further, the Example tires 1 and 2 were greatly improved in the total performance as shown in FIG. 11(a)–(e). Contrary, in the reference tires in which the circumferential pattern stiffness was larger than the axial pattern stiffness, the total performance, in particular the linearity of the side force, was not good. Furthermore, it was found that, by providing the bead filler 11, the tires of the present invention could be effectively improved in the total performance. That is, by increasing the bead rigidity, the effect of the tread pattern rigidity on improving the total tire performance was enhanced.

The invention being thus described, it will be obvious that the same may be varied in many ways. Such variations are not to be regarded as a departure from the spirit and scope of the invention, and all such modifications as would be obvious to one skilled in the art are intended to be included within the scope of the followings claims.

line (X) passing a center point (O) on the top surface, and each said second moment of area Iy is of the shape of the top surface of each said block BT about an axial line (Y) passing the center point (O), with respect to said blocks BT, the total square width $\Sigma Jy^2$ is in the range of from 2.5 to 50 times the total square length $\Sigma Jx^2$, said total square width $\Sigma Jy^2$ is of the squares $Jy^2$ of all said blocks BT, Jy being the maximum axial width of the top surface of each of said blocks BT, said total square length $\Sigma Jx^2$ is of the squares $Jx^2$ of all said blocks BT, Jx being the maximum circumferential length Jx of the top surface of each of said blocks BT; each of said blocks BT in the ground contacting part is provided with a sipe, and the sipes in said blocks BT in the tread central region have a circumferen-

TBLE 1

Figure 9A:
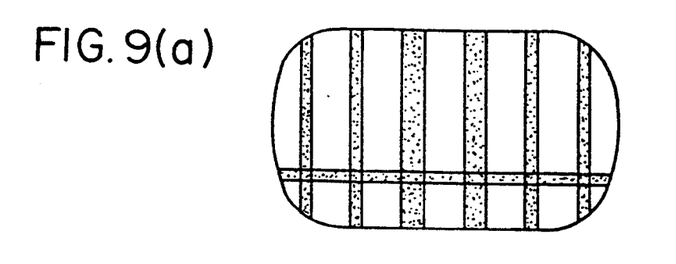
FIGS. 9(a)–(d) are diagrams showing block patterns used in test tires.
Figure 9B:
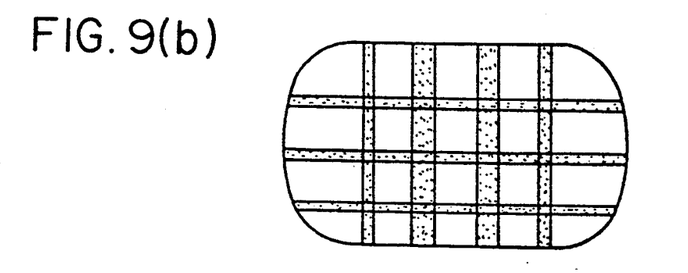
Figure 9C:
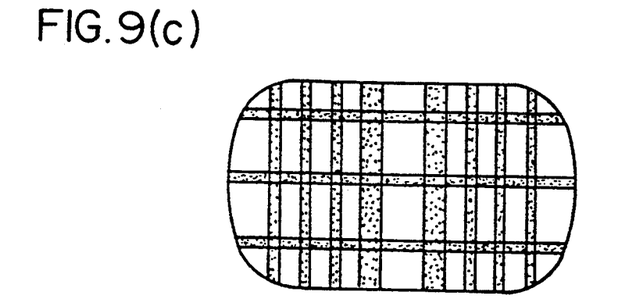
Figure 9D:
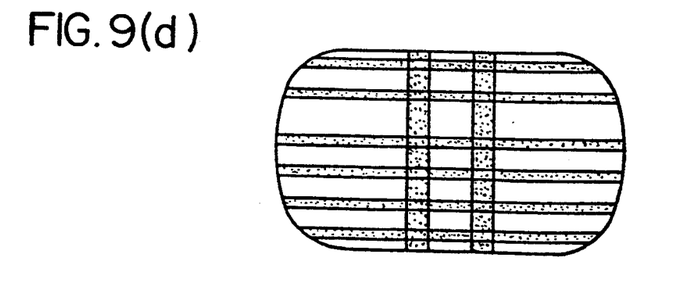

|  | Ref. 1 | Ref. 2 | Ref. 3 | Ex. 1 | Ex. 2 |
|---|---|---|---|---|---|
| Tread pattern | FIG. 9(a) | FIG. 9(b) | FIG. 9(c) | FIG. 9(d) | FIG. 3 |
| Land ratio Sb/St | 0.78 | 0.66 | 0.66 | 0.68 | 0.77 |
| $\Sigma Ix/\Sigma Iy$ | 0.12 | 2.54 | 0.50 | 19.10 | 4.3 |
| $\Sigma Jy^2/\Sigma Jx^2$ | 0.16 | 2.40 | 0.56 | 34.0 | 3.2 |
| Bead apex hardness (JIS-A) | 90 | 90 | 90 | 90 | 90 |
| Bead filler cord | steel | steel | steel | steel | steel |
| Ground contacting width WY/length WX | 188/119 = 1.58 | 183/123 = 1.49 | 185/122 = 1.52 | 178/125 = 1.42 | 181/115 = 1.57 |
| Circumferential groove |  |  |  |  |  |
| Number | 6 | 4 | 8 | 2 | 2 |
| Depth D1 (mm) | 8 | 8 | 8 | 8 | 8 |
| Axial groove |  |  |  |  |  |
| Depth D2 (mm) | 6 | 6 | 6 | 6 | 6 |
| Sipes | non | non | non | non | presence |
| Test Result *) |  |  |  |  |  |
| Response gain | A | B | C | A | A |
| Linearity | C | B | C | A | A |
| Rear rip | A | C | C | B | A |
| High speed stability | C | C | C | B | B |
| Maneuverability | C | C | B | B | A |
| TOTAL | C | C | C | B | A |

*) A B C ← good bad →

We claim:

1. A radial tire comprising
   a tread portion,
   a pair of bead portions with a bead core in each of the bead portions,
   a pair of sidewall portions,
   a radial carcass extended between the bead portions and turned up around the bead cores, and
   a belt disposed radially outside the carcass,
   said tread portion includes a plurality of axial grooves and only two circumferential grooves, one of said circumferential grooves being disposed on each side of the tire equator in a tread central region, said tread central region centered on the tire equator and having an axial width of ¼ times the maximum axial width of the ground contacting part, said axial grooves and circumferential grooves defining a block pattern consisting of blocks,
   said block pattern having a land ratio of not less than 0.67, said land ratio defined as the total (Sb) of the top surface areas of all said blocks divided by the total area (St) of the tread face, said blocks including blocks BT which exist wholly or partially in the ground contacting part of the tread,
   with respect to said blocks BT, the total $\Sigma I_x$ of second moment of areas $I_x$ of all said blocks BT being larger than the total $\Sigma I_y$ of second moment of areas $I_y$ of all said blocks BT, wherein each said second moment of area $I_x$ is of the shape of the top surface of each of said block BT about a circumferential tial component and an axial component, the total $\Sigma Lx$ of the lengths Lx of the circumferential components of all said sipes is smaller than the total $\Sigma Ly$ of the lengths Ly of the axially components thereof, the depth of said circumferential grooves is larger than the depth of the axial grooves, the maximum axial width of the ground contacting part is not less than 1.4 times the maximum circumferential length thereof, the width of said circumferential grooves is not less than 10 mm and the depth thereof is not less than 8 mm, and the groove centers of said two circumferential grooves are spaced apart from each other by a distance of from 0.10 to 0.20 times the maximum axial width of the ground contacting part when measured axially.

2. The radial tire according to claim 1, wherein each of said circumferential grooves is a straight groove having a constant width and a constant depth in the longitudinal direction thereof.

3. The radial tire according to claim 1, wherein each of said circumferential grooves is a straight groove having a constant width and a constant depth in the longitudinal direction thereof, and each of the axial grooves is a straight groove extending parallel to the axial direction of the tire, whereby said blocks have a rectangular shape.

4. The radial tire according to claim 1, wherein all the ends of the sipes are terminated within said blocks.

* * * * *